United States Patent [19]

Rabideau et al.

[11] Patent Number: 4,670,239

[45] Date of Patent: Jun. 2, 1987

[54] PHOTOCHEMICAL PREPARATION OF PLUTONIUM PENTAFLUORIDE

[75] Inventors: Sherman W. Rabideau; George M. Campbell, both of Los Alamos, N. Mex.

[73] Assignee: The United States of America as represented by the United States Department of Energy, Washington, D.C.

[21] Appl. No.: 862,303

[22] Filed: Dec. 20, 1977

[51] Int. Cl.$^4$ ..................... C01G 56/00; B01D 59/00
[52] U.S. Cl. ........................................ 423/251; 423/3; 204/157.22
[58] Field of Search .................. 423/251; 204/157.1 R

[56] References Cited

U.S. PATENT DOCUMENTS 4,082,633  4/1978  Eerkens ........................... 204/157.22
4,522,794  6/1985  Hochel et al. ....................... 423/251

OTHER PUBLICATIONS

Brewer, L. et al. "The Higher Fluorides of Plutonium", UCRL-633 (Mar. 20, 1950).
Steindler, M. J. "Laboratory Investigations in Support of Fluid Bed Fluoride Volatility Processes Pt. II. The Properties of Plutonium Hexafluoride", ANL-653.
Trevorrow, L. E. et al. "The Thermal Decomposition of Plutonium Hexafluoride", J. Phys. Chem. 65:398-403, 1961.
Tsujimura, S. et al. "Thermal Decomposition of Plutonium Hexafluoride", J. Nucl. Sci. and Tech. 9:534-7, 1972.

*Primary Examiner*—John F. Terapane
*Assistant Examiner*—Virginia B. Caress
*Attorney, Agent, or Firm*—Edward C. Walterscheid; Ray G. Wilson; Judson R. Hightower

[57] ABSTRACT

The novel compound plutonium pentafluoride may be prepared by the photodissociation of gaseous plutonium hexafluoride. It is a white solid of low vapor pressure, which consists predominantly of a face-centered cubic structure with $a_o = 4.2709 \pm 0.0005$ Å.

4 Claims, No Drawings

PHOTOCHEMICAL PREPARATION OF PLUTONIUM PENTAFLUORIDE

This invention is the result of a contract with the Department of Energy (Contract No. W-7405-ENG-36).

BACKGROUND OF THE INVENTION

The invention described herein relates to the compound plutonium pentafluoride ($PuF_5$) and a photochemical method for preparing it.

Plutonium hexafluoride ($PuF_6$) has a substantial vapor pressure at or near room temperature and is therefore a useful feed material in a process for plutonium isotope separation based on an isotope-selective, laser-induced photodissociation reaction.

It is well known in the literature that the thermal decomposition of $PuF_6$ results in the formation of $PuF_4$ and $F_2$. Alpha particle irradiation produces the same products. In either instance, the net result is as shown in equation (1).

$$PuF_6(g) \xrightarrow{\Delta \text{ or } \alpha} PuF_4(s) + F_2(g) \quad (1)$$

In a laser-induced isotope separation process, however, photodissociation to $PuF_5$ would be preferable, since less energy is required to abstract one fluorine atom than two.

Thermodynamic considerations suggest that $PuF_5$ should be capable of existence. Heretofore, however, all efforts to isolate it have been unsuccessful.

SUMMARY OF THE INVENTION

We have now found that when gaseous $PuF_6$ is irradiated with radiation of a wavelength less than 520 nm, a white solid product is formed which has been identified as $PuF_5$. The $PuF_5$ is readily formed when the $PuF_6$ is irradiated using a nitrogen laser at 337.1 nm.

DESCRIPTION OF THE PREFERRED EMBODIMENT

Plutonium pentafluoride, a white solid product of low vapor pressure, is formed by the photochemical reduction of gaseous $PuF_6$ using a nitrogen laser at 337.1 nm. Similar results are also obtained by using a nitrogen-pumped dye laser with an output at 480 nm for the photodecomposition of $PuF_6$. The stoichiometry of the reaction in equation (2)

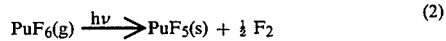

$$PuF_6(g) \xrightarrow{h\nu} PuF_5(s) + \tfrac{1}{2} F_2 \quad (2)$$

was determined by measuring the pressure in a nickel cell equipped with quartz windows while simultaneously irradiating with a nitrogen laser (or the dye laser). A Validyne pressure transducer which had been calibrated against a quartz spiral manometer was used for the pressure measurements. The pressure decrease indicated by equation (2) was observed on a strip chart recorder and the extent of the pressure loss was proportional to the irradiaton time, at least until the window was screened by the formation of the deposit. The production of $F_2$ as indicated by equation (2) was supported by data obtained by cooling the gas to $-78°$ C. in a dry ice trap and removing the non-condensible gas at this temperature. (Boiling point of $F_2 = -188°$ C.) The quantity of plutonium hexafluoride lost was then determined by warming the gas to room temperature and measuring the pressure difference.

Experimental evidence for the nitrogen laser preparation of $PuF_5$ is given in the Table. When Cell I which consisted of quartz and nickel was used, the laser was not focused. When Cell II which consisted of sapphire and nickel was used, the laser was focused. Both cells were conditioned with $F_2$ and with $PuF_6$ prior to irradiation. The percentages of $PuF_5$ and $PuF_4$ in the solid product were calculated from stoichiometry, i.e., loss of $PuF_6$ and formation of $F_2$. The data of the Table show that under certain conditions the stoichiometry of equation (2) was closely followed.

TABLE

| Cell | Irradiation Time (Min.) | Initial Pressure of $PuF_6$ (Torr) | Pressure After Laser Irradiation (Torr) | Pressure After Fluorine Removal (Torr) | Percentage of $PuF_5$ in Solid Product | Percentage of $PuF_4$ in Solid Product |
|---|---|---|---|---|---|---|
| I | 14.0 | 74.50 | 72.43 | 69.90 | 90.0 | 10.0 |
| I | 29.0 | 70.20 | 66.20 | 62.15 | 99.4 | 0.6 |
| I | 75.0 | 52.67 | 49.12 | 45.55 | 99.7 | 0.3 |
| I | 84.0 | 44.00 | 37.60 | 31.20 | 100.0 | 0.0 |
| II | 98.0 | 59.72 | 56.23 | 51.15 | 81.4 | 18.6 |
| II | 125.0 | 43.81 | 38.70 | 28.49 | 66.7 | 33.3 |

A powder x-ray diffraction pattern of the white solid photodecomposition product was initially amorphous; however, after the solid was heated at 125° C. for 65 hours a crystalline product was obtained. Analysis of the x-ray data indicated the presence of two crystal phases. The predominate phase which constituted about 85% of the product had a face-centered cubic structure with $a_o = 4.2709$ Å $\pm 0.0005$ Å. The second phase was not identified. Neither phase had the structure parameters which are associated with the compounds $PuF_3$, $PuF_4$ or $PuF_6$.

An infrared examination was made of the solid $PuF_5$ deposit which had formed with laser irradiation on windows of AgCl and also on windows of NaCl. The spectral absorption features were very similar in these two cases. A single absorption peak centered at 617 $cm^{-1}$ was found. The full width at half maximum of this peak was about 15 $cm^{-1}$. When $PuF_4$ was formed by the thermal decomposition of $PuF_6$ and deposited on AgCl windows, no absorption was noted in the 600 to 700 $cm^{-1}$ region.

To permit an infrared spectral comparison to be made between $PuF_5$ and $UF_5$, the latter compound was deposited photochemically by the reduction of $UF_6$ on a KCl window. A broad infrared absorption peak with a maximum at 505 $cm^{-1}$ was observed; this absorption is very similar to that observed for $PuF_5$ at 617 $cm^{-1}$.

Nitrogen pumped dye lasers with outputs at 480, 500 and 520 nm were found to decompose $PuF_6$ photochemically with decreasing efficiency, and a practical threshold energy is that corresponding to the 520 nm wavelength. A dye laser with an output of 560 nm did not reduce $PuF_6$ when used as the single source of radiation; however a photodecomposition occurred when this wavelength was combined with a dye laser with an output of 794 nm. In the experimental arrangement used, both dyes were pumped with the same nitrogen laser so that appropriate synchronization was assured.

$PuF_6$ was also photochemically decomposed in an all quartz cell of 1 cm path length with the nitrogen laser. After removing the excess $PuF_6$, a white deposit remained which has been identified above as $PuF_5$. The deposit was dissolved rapidly and completely in an aqueous solution mixture of saturated $Al(NO_3)_3$ and 0.1M $HNO_3$. A pink color characteristic of $PuO_2^+$ was observed initially. A spectrophotometric examination of the solution indicated the presence of both $PuO_2^+$ and $Pu^{+4}$ ions, both products of the disproportionation of the $PuO_2^+$ ion.

The foregoing examples are merely illustrative of preferred embodiments of the invention and do not limit in any way the scope of the invention. It will be understood that the scope of the invention is as set forth in the Summary of the Invention and encompassed by the broad claims appended hereto.

What we claim is:

1. As a composition of the matter, the compound $PuF_5$.

2. A method of preparing $PuF_5$ which comprises irradiating $PuF_6$ with radiation having a wavelength less than 520 nm and an intensity sufficient to photodissociate said $PuF_6$ to $PuF_5$.

3. The method of claim 2 wherein said radiation has a wavelength of about 337 nm.

4. The method of claim 2 wherein said radiation has a wavelength of about 480 nm.

* * * * *